United States Patent [19]

Camacho

[11] Patent Number: 5,182,073
[45] Date of Patent: Jan. 26, 1993

[54] APPARATUS FOR SURFACE TREATING METAL BILLETS

[75] Inventor: Salvador L. Camacho, Wake County, N.C.

[73] Assignee: Plasma Energy Corporation, Raleigh, N.C.

[21] Appl. No.: 607,551

[22] Filed: Nov. 1, 1990

[51] Int. Cl.$^5$ .............................................. B23K 7/06
[52] U.S. Cl. ...................................... 266/52; 266/200; 266/261; 219/121.37
[58] Field of Search .................... 266/51, 52, 105, 200, 266/261; 219/121.37, 121.38, 121.17, 121.16, 121.65; 148/9.5, 203, 202, 205

[56] References Cited

U.S. PATENT DOCUMENTS

| | | | |
|---|---|---|---|
| 2,465,297 | 3/1949 | Thompson et al. | 148/9.5 |
| 2,482,945 | 9/1949 | Smith | 148/151 |
| 2,487,974 | 11/1949 | Kirk | 148/9.5 |
| 2,555,527 | 6/1951 | Anderson | 148/9.5 |
| 3,575,395 | 4/1971 | Gentry | 432/234 |
| 4,549,065 | 10/1985 | Camacho et al. | 219/121.37 |
| 4,587,397 | 5/1986 | Camacho et al. | 219/121.48 |
| 4,620,840 | 11/1986 | Hilge et al. | 432/121 |

FOREIGN PATENT DOCUMENTS 544860 4/1942 United Kingdom ................. 148/9.5

*Primary Examiner*—R. Bean
*Assistant Examiner*—Margery S. Phipps
*Attorney, Agent, or Firm*—Bell, Seltzer, Park & Gibson

[57] ABSTRACT

An apparatus for eliminating chevron cracks or other imperfections in the surface of elongate billets as billets pass vertically downwardly through a heating chamber, including a plurality of plasma arc torches. The heating chamber contains a billet mold having an opening complementary in size and shape to the cross-sectional shape of the billet. Heat imparted to the billet in the upper portion of the chamber melts surface portions of the billet. Molten material discharged from the surface portions of the billet forms a pool in an area above the mold opening. As the billet passes through the pool, some of the molten material reattaches itself to the billet surfaces. Billet conveyors pivotally movable between horizontal and vertical positions transport billets to and from the heating chamber, and control the rate at which the billets move through such chamber and through a cooling chamber located beneath the heating chamber.

17 Claims, 5 Drawing Sheets

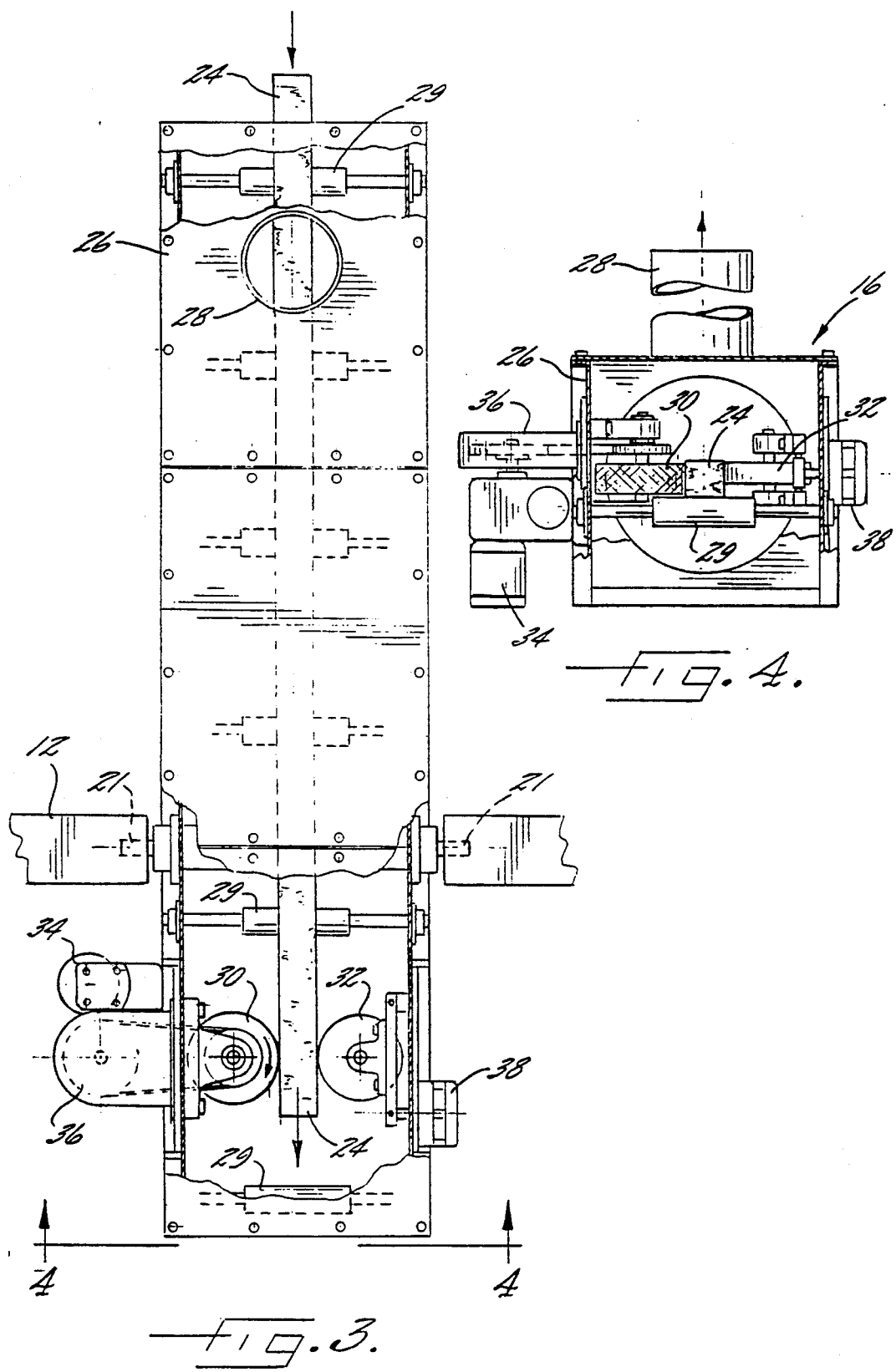

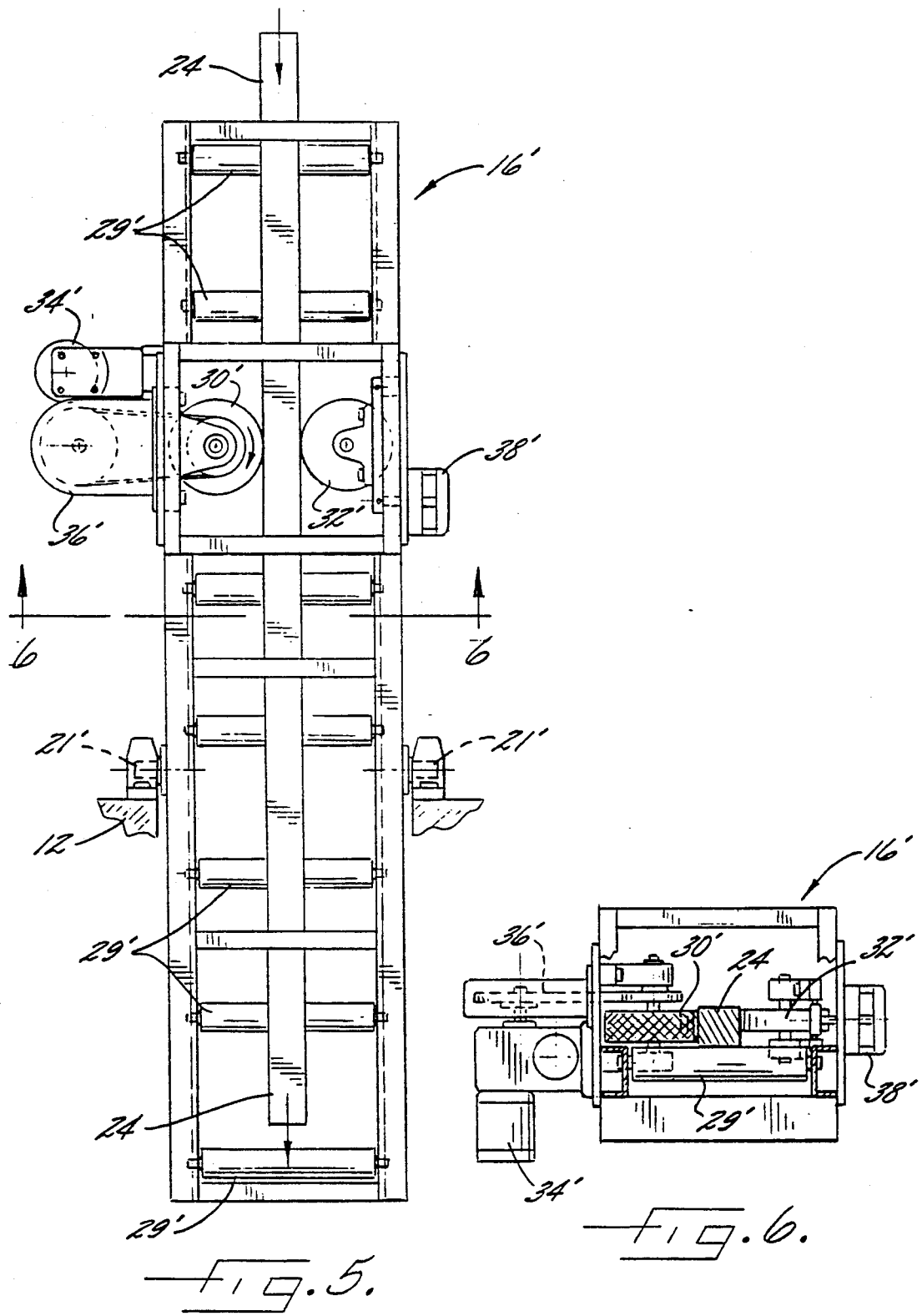

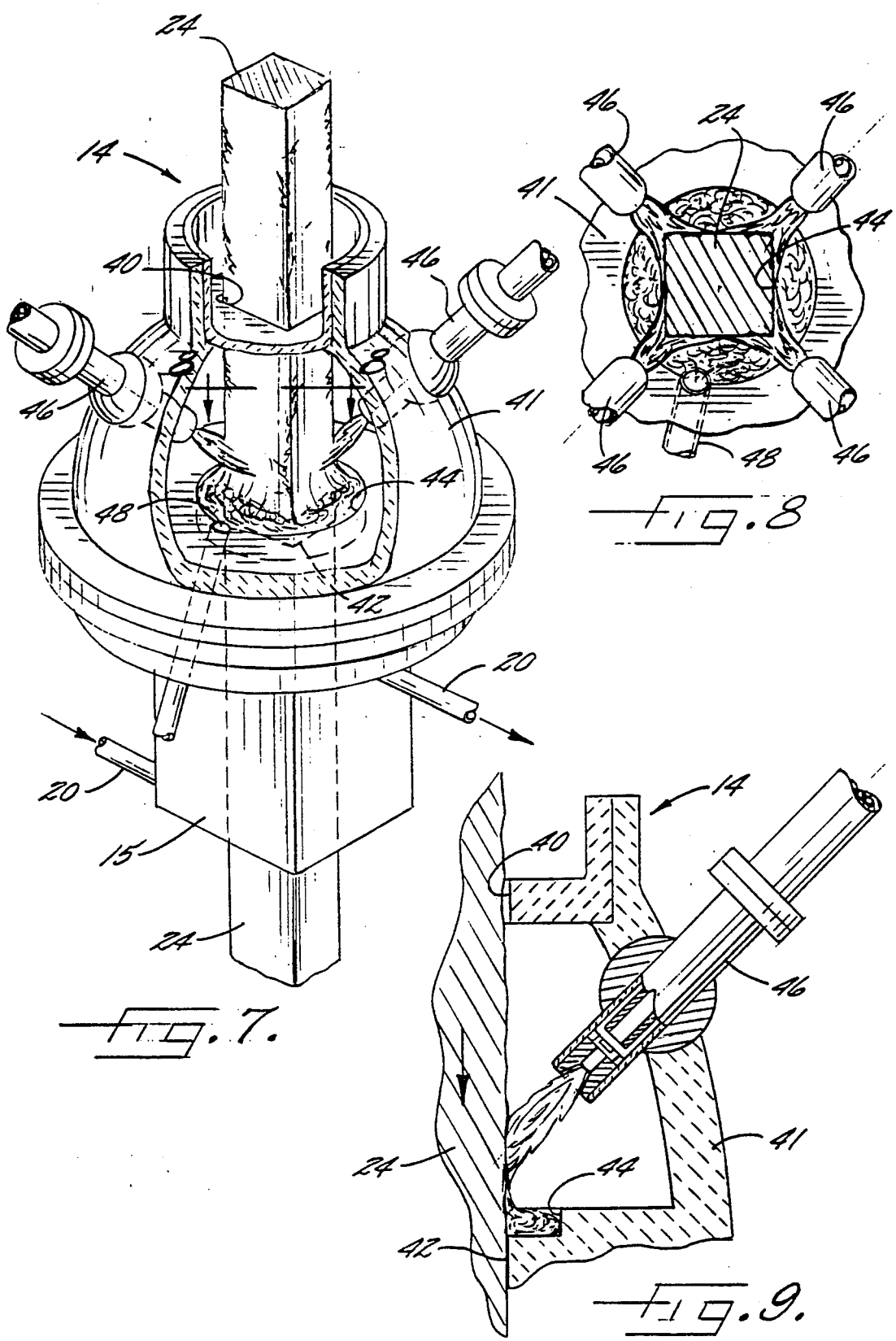

APPARATUS FOR SURFACE TREATING METAL BILLETS

FIELD OF THE INVENTION

This invention relates to an apparatus and method for surface treating elongate metal billets for the purpose of improving the quality of the billets.

BACKGROUND OF THE INVENTION

Cast metal billets frequently contain surface imperfections, such as "chevron" cracks. Imperfections are particularly likely to occur when the billets are of square, rectangular, or other non-circular cross-sectional shape, and are bent so as to follow a curved path of travel reorienting them from a generally vertical orientation to a generally horizontal orientation as they are discharged from a casting machine. Such imperfections undesirably reduce the quality and value of the billets.

SUMMARY OF THE INVENTION

The present invention provides an improved apparatus and method for efficiently and economically heat treating cast metal billets so as to eliminate many if not all of their chevron cracks and similar surface imperfections.

In a preferred embodiment thereof, the apparatus of the invention includes a heating chamber through which the billets to be treated pass sequentially downwardly along a generally vertical path of travel. A billet mold within the chamber has an opening encircling the path of billet travel. The mold opening has a size and shape complementary to the cross-sectional size and shape of the billets undergoing treatment. Heating means mounted within the chamber heats each billet to a temperature sufficient to cause melting of surface portions of the billet. The molten material is collected in a pool overlying the part of the mold containing the mold opening, and some of the material reattaches to the billet surfaces as the billets pass downwardly through the pool to the mold opening.

The apparatus may further include at least one, and preferably two, billet transporting assemblies, each of which is movable between a position in which it extends generally horizontally, and another position in which it extends generally vertically and is axially aligned with the heating chamber. Each of the transporting assemblies preferably includes pinch rolls that engage billets received thereby, and that control the passage of the billets through the assemblies and through the heating chamber.

The method of the invention includes the steps of conducting an elongate metal billet axially downwardly along a generally vertical path of travel through a heating chamber containing a mold having a billet-receiving opening corresponding closely in size and shape to the cross-sectional size and shape of the billet. The method further includes the steps of heating the billet so as to cause partial melting of and discharge of molten material from its surface portions; forming a pool of the discharged molten material above the mold opening; and conducting the billet firstly through the pool of molten material and then through the mold opening. The method may further include changing the horizontal/vertical orientation of the billets preparatory to and/or immediately after their treatment. The method preferably also includes the step of cooling each of the billets following passage thereof from the heating chamber.

DESCRIPTION OF THE PRIOR ART

The following U.S. Pat. Nos. may be relevant to the present invention: 2,465,297, 2,487,974, 3,575,395, 4,620,840, 4,549,065 and 4,587,397.

BRIEF DESCRIPTION OF THE DRAWINGS

Other features of the invention will be apparent from the following description of an illustrative embodiment thereof, which should be read in conjunction with the accompanying drawing in which:

FIG. 3 is an enlarged partially broken-away view, primarily in side elevation taken substantially along the line 3—3 of FIG. 1, of the upper billet transporting assembly and adjacent mounting components;

FIG. 4 is an end view, taken in the direction of the arrows 4—4 of FIG. 3, of the upper billet transporting assembly;

FIG. 5 is an enlarged side elevational view, taken substantially along the line and in the direction of the arrows 5—5 of FIG. 2, of the lower billet transporting assembly and adjacent mounting components;

FIG. 6 is an enlarged end view, primarily in elevation but partially in horizontal section, taken substantially along the line and in the direction of the arrows 6—6 of FIG. 5, of the lower billet transporting assembly;

FIG. 7 is a partially broken away perspective view of heating and cooling chambers of the apparatus, of components associated therewith, and of a billet passing therethrough;

FIG. 8 is a fragmentary horizontal sectional view taken through the billet within the heating chamber shown in FIG. 7, and also showing in top plan portions of heating torches and a billet mold within the heating chamber; and FIG. 9 is an enlarged fragmentary vertical section through part of the heating chamber, billet, billet mold and one of the heating torches of the apparatus.

DESCRIPTION OF THE ILLUSTRATED EMBODIMENT

Figure 1:
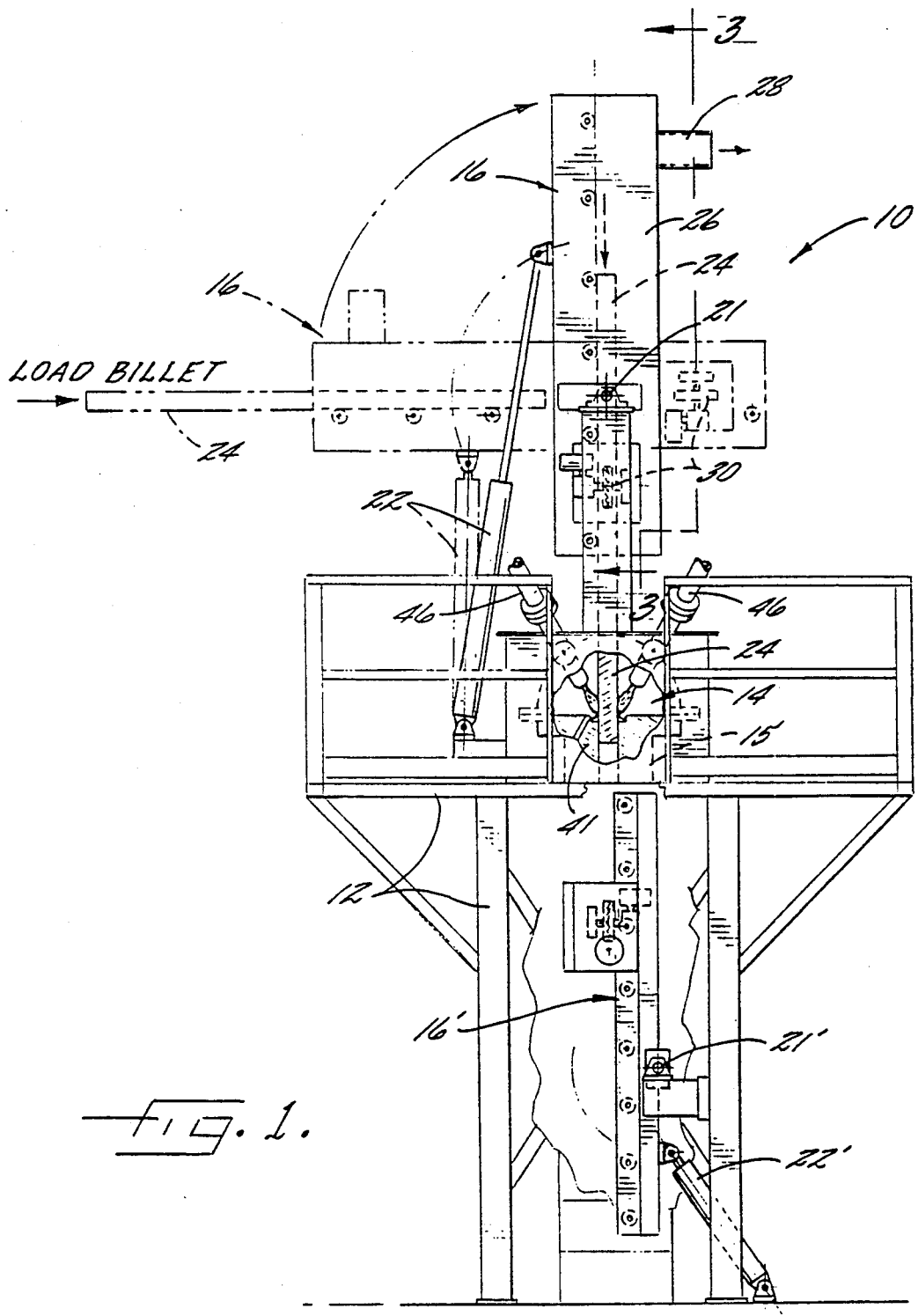
FIG. 1 is a front elevation view of an apparatus in accordance with the invention, an upper billet transporting assembly being shown by solid lines in a vertical orientation and by phantom lines in an alternative horizontal orientation.
Figure 2:
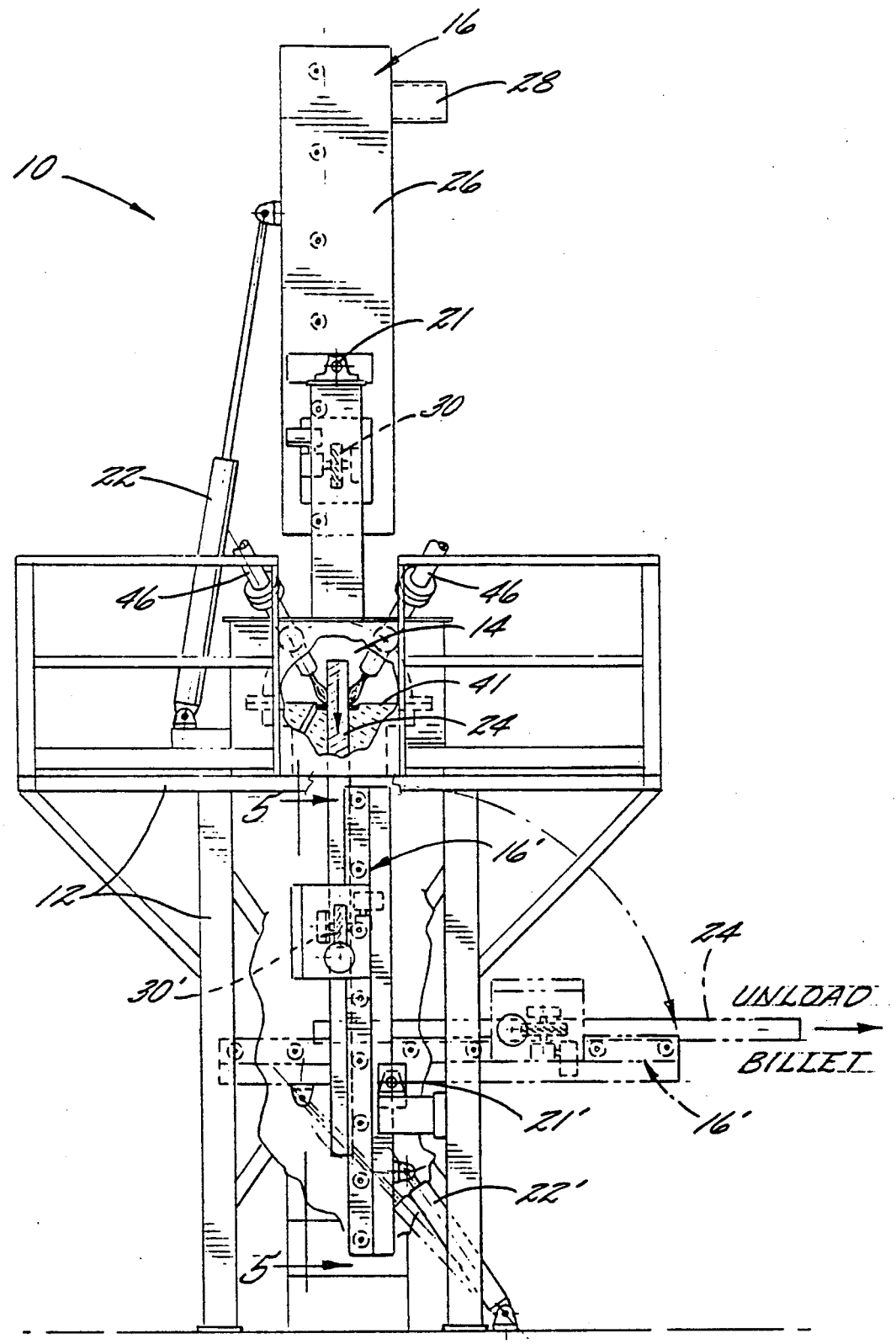
FIG. 2 is a view similar to FIG. 1 but shows a lower billet transporting assembly in phantom lines in an alternative horizontal orientation.

The apparatus identified in its entirety in FIGS. 1 and 2 by the numeral 10 includes a frame 12 that supports stationary heating and cooling chambers 14, 15, and upper and lower movable billet transporting assemblies 16, 16', respectively.

Upper transporting assembly 16 is mounted by frame 12 for pivotal movement about an axis 21 between first and second positions respectively shown by phantom and solid lines in FIG. 1. Assembly 16 is moved between its aforesaid positions by a piston and cylinder assembly 22 and suitable control means (not shown) which at desired times effects extension and retraction of assembly 22. In its first, generally horizontally extending position, conveyor assembly 16 receives an elongate metal billet 24 introduced into one end thereof from a casting machine or other source (not shown). In its second, generally vertically extending position, billet transporting assembly 16 overlies and is vertically aligned with heating chamber 14, and effects controlled movement of the billet 24 carried thereby along a vertically extending path of travel through heating and cooling chambers 14, 15. As is best shown in FIG. 3, billet conveyor 16 includes a generally rectangular housing 26 having open opposite ends. The housing also has a gas outlet 28 adjacent the end thereof that is uppermost when assembly 16 occupies its generally vertical position. A series of idler rolls 29 mounted within housing 26 at spaced intervals along the length thereof supportively engage the billets 24 introduced into the housing. A pair of cooperating pinch rolls 30, 32 are mounted adjacent the downstream (lower, as viewed in FIG. 3) end of housing 26 upon opposite sides of the generally vertically extending path of billet travel through the housing. Roll 30 is positively driven at desired times in a clockwise direction (as viewed in FIG. 3) by a drive motor 34 and an associated belt-type transmission mechanism 36. The cylindrical surface of roll 34 is knurled or otherwise formed so as to prevent slippage between it and the surface of a billet 24 engaged thereby. To ensure firm engagement of rolls 30, 32 with each billet 24 passing through housing 26, roll 32 is mounted for movement toward and away from the path of billet travel and is biased at desired times toward a billet passing along such path by a piston and cylinder assembly 38 mounted upon the downstream end portion of assembly 16.

Lower billet transporting assembly 16' is similar in many respects to upper transporting assembly 16, and like components are identified by the same reference numeral with the addition of a prime designation. Assembly 16' is mounted for pivotal movement about an axis 21' by a piston and cylinder assembly 22' between first and second positions respectively shown by solid and phantom lines in FIG. 2. In its first position, assembly 16' underlies and is vertically aligned With heating chamber 14 and cooling chamber 15, and receives each treated billet 24 passing axially downwardly through and from chambers 14, 15. In its second (phantom line) position, assembly 16' extends generally horizontally and discharges billets 24 carried thereby axially onto a suitable receiver (not shown). Referring now also to FIGS. 5 and 6, lower billet transporting assembly 16' includes an array of longitudinally spaced idler rolls 29' that supportively engage billets 24 transported by the assembly. It also includes pinch rolls 30', 32', a drive motor 34', a belt transmission mechanism 36', and a biasing piston and cylinder assembly 38'. It differs from upper conveyor assembly 16 in that it has no housing. This facilitates further cooling of the billets 24 conveyed thereby. Additionally, the billet engaging pinch rolls 30', 32' of lower conveyor assembly 16' are adjacent the upstream (upper, as viewed in FIG. 5) end of the assembly, rather than adjacent the downstream end thereof. The vertical distance between the pinch rolls of the respective transporting assemblies 16, 16', when such assemblies occupy their vertical positions shown by solid lines in FIG. 2, is such that while a billet 24 is passing vertically between them and through chambers 14, 15, it is continuously engaged by the pinch rolls of at least one of the two assemblies 16, 16'. Such engagement ensures that the vertical movement of the billets through chambers 14, 15 is always at a preselected desired rate. In addition to performing the foregoing function, the pinch rolls of the assembly 16, 16' also advance billets introduced therein toward the discharge ends of the assemblies when they occupy their horizontal positions.

Referring now also to FIGS. 7-9 of the drawings, the heating chamber 14 through which billets 24 successively and downwardly pass is formed at least in substantial part of heat-resistant refractory material. Chamber 14 has a billet inlet opening 40 adjacent its upper end. A billet mold 41 adjacent the lower end portion of chamber 4o has an opening 42 through which billets 24 pass as they move downwardly through and from chamber 14. Opening 42 corresponds closely in cross-sectional size and shape to the cross-sectional size and shape (illustratively square) of the billets 24 undergoing treatment. Mold 41 also has a recessed area 44 that encircles and communicates with the path of travel of billets 24 at a location above mold opening 42.

Heating means, illustratively in the form of a plurality of plasma arc torches 46 project into chamber at a location intermediate the height thereof and heat the billets 24 passing through the chamber. Torches 46 preferably and illustratively are of the type that operate in the non-transfer arc mode. Torches of such type are known in the art, and a more detailed description thereof may be obtained from U.S. Pat. Nos. 4,549,065 and/or 4,587,397 to Camacho et al., the disclosures of which are incorporated herein by reference. Preferably four torches 46 are provided when the billets 24 are, as shown, of square cross-sectional shape. The torches preferably extend at an angle of approximately 40°-60° relative to the vertical path of travel of billets 24 through chamber 14. They are spaced equally about the circumference of such path, preferably and illustratively at locations wherein the "working" ends of the torches confront respective ones of the four longitudinal edges of the billet undergoing treatment. When so located, the heated plasma discharged from the torches engages the aforesaid edge portions of the billets and also the sides of the billet undergoing treatment. Additionally, the heated gases rise upwardly and effect preheating of the downwardly moving billet within the upper portion of chamber 14 and, to a lesser extent, within the housing of upper billet conveyor 16. The heat imparted to each billet 24 removes oxides from and effects melting of its surface portions as they pass through the upper portion of chamber 14. This eliminates chevron cracks and/or other imperfections from the surface portions of the billet undergoing treatment. Molten material discharged from the surface portion of the billets forms a pool within recessed area 44 of mold 41. As the billet passes through such pool, some of the molten material reattaches to the billet surfaces, which further assists in improving the quality of the billet. The immediately following passage of the billet through the closely conforming opening 42 of mold 41 smoothes the reconstituted billet surfaces and prevents attachment of excessive amounts of the molten material to them. An overflow drain conduit 48 communicating with recessed area 44 of mold 41 drains slag and molten material from such area when the quantity of such material would otherwise become excessive.

Each billet 24 passing from heating chamber 14 enters cooling chamber 15 and is there cooled by water circulated through the chamber by conduits 20. After exiting from chamber 15, the billet is reoriented to a horizontal orientation and discharged from apparatus 10 by lower conveyor assembly 16'.

While a specific embodiment of the invention has been shown and described, this was for purposes of illustration only, and not for purposes of limitation, the scope of the invention being in accordance with the following claims.

I claim:

1. Apparatus for heat treating elongate metal billets, comprising:
   a heating chamber through which said billets sequentially and longitudinally pass along a substantially vertical path of travel;
   a billet mold within said chamber adjacent said path of travel;
   billet heating means within said chamber adjacent said path of travel for heating said billets passing along said path of travel; said billet heating means including a plurality of plasma arc torches located at circumferentially spaced intervals about and in adjacent relationship to said billet path of travel upstream from said mold;
   billet transporting means for transporting said billets to, substantially vertically through, and from said heating chamber; said transporting means including at least one billet transporting assembly mounted for movement between a first position wherein said assembly extends substantially vertically, and a second position wherein said assembly extends generally horizontally;
   said billet transporting assembly including a plurality of billet engaging rolls mounted in spaced relationship to each other along the length of said assembly for engagement with said billets transported by said assembly; and
   drive means for moving said assembly between said positions thereof.

2. Apparatus as in claim 1, wherein said assembly is pivotally movable between said positions thereof, and said rolls include a pair of pinch rolls located upon opposite sides of said path of travel and engageable with billets passing along said path.

3. Apparatus as in claim 2, and further including drive means for imparting rotation to at least one of said pinch rolls.

4. Apparatus as in claim 2, and further including power-operated means for urging at least one of said pinch rolls toward said path of travel and toward billets passing along said path.

5. Apparatus as in claim 2, wherein at least one of said pinch rolls has an anti-slip surface engageable with said billets.

6. Apparatus as in claim 1, wherein said billet mold has an opening through which said billets pass during movement thereof along said path of travel, said opening having a shape and size complementary to the cross-sectional shape and size of said billets.

7. Apparatus as in claim 6, wherein said mold further has an area encircling and communicating with said path of travel of said billets for receiving and forming a pool of molten material released from said billets during heating thereof by said heating means.

8. Apparatus as in claim 7, and further including a drain communicating with said area of said mold for draining some of said molten material from said area and from said heating chamber.

9. Apparatus as in claim 1, wherein said billets are of substantially square cross-sectional shape, and the number of said torches is four.

10. Apparatus as in claim 9, wherein said four torches are positioned so as to be adapted to confront respective ones of the longitudinal edges of said billets.

11. Apparatus as in claim 1, and further including a billet cooling chamber underlying said heating chamber.

12. Apparatus for heat treating elongate metal billets, comprising:
   a heating chamber through which said billets sequentially and longitudinally pass along a generally vertical path of travel;
   a billet mold within said chamber adjacent said path of travel;
   billet heating means within said chamber adjacent said path of travel for heating said billets passing along said path of travel;
   said billet mold having an opening through which said billets pass during movement thereof along said path of travel, said opening having a shape complementary to the cross-sectional shape of said billets;
   said mold further having an area encircling and communicating with said path of travel of said billets for receiving molten material released from said billets during heating thereof by said heating means;
   said billet heating means including a plurality of plasma arc torches spaced from each other about the circumference of said path of travel and located above said mold;
   billet transporting means for transporting said billets to, generally vertically through, and from said heating chamber, said transporting means including two billet transporting assemblies, each of said assemblies being mounted for pivotal movement between a first position wherein said assembly extends generally vertically and is aligned with said path of travel of said billets through said heating chamber, and a second position wherein said assembly extends substantially horizontally; and
   drive means for moving said assemblies independently of each other between said positions thereof.

13. Apparatus as in claim 12, wherein said drive means includes first and second piston and cylinder assemblies respectively connected to respective ones of said billet transporting assemblies.

14. Apparatus as in claim 13, wherein each of said billet transporting assemblies includes pinch rolls located upon opposite sides of said path of travel of said billets, said pinch rolls being engageable with said billets passing along said path, drive means for at desired times imparting rotation to at least one of said pinch rolls, and means for urging at least one of said pinch rolls toward said path of travel.

15. Apparatus as in claim 14, wherein at least one of said pinch rolls has a knurled surface engageable with said billets passing along said path of travel.

16. Apparatus as in claim 15, wherein each of said billet transporting assemblies further includes a plurality of idler rolls located at longitudinally spaced intervals along the length thereof in laterally adjacent relationship to said path of travel of said billets.

17. Apparatus for heat treating elongate metal billets, comprising:
   a heating chamber through which said billets sequentially pass along a substantially vertical path of travel;

a billet mold within said chamber adjacent said path of travel;

billet heating means within said chamber adjacent aid path of travel for heating said billets passing along said path of travel, said billet heating means including a plurality of plasma arc torches located at circumferentially spaced intervals about and in adjacent relationship to said billet path of travel upstream from said mold;

a billet cooling chamber underlying said heating chamber;

billet transporting means for transporting said billets to, substantially vertically through, and from said heating chamber; said transporting means including at least one billet transporting assembly mounted for movement between a first position wherein said assembly extends generally vertically, and a second position wherein said assembly extends generally horizontally;

said billet transporting assembly including a plurality of billet engaging rolls mounted in spaced relationship to each other along the length of said assembly for engagement with said billets transported by said assembly;

drive means for moving said assembly between said positions thereof; and said billets being of substantially square cross sectional shape, and the number of said torches being four, with the four torches being positioned so as to be adapted to confront respective ones of the longitudinal edges of said billets.

* * * * *